United States Patent [19]
Cho

[11] Patent Number: 5,640,856
[45] Date of Patent: Jun. 24, 1997

[54] MOUNTING DEVICE FOR TEMPERATURE CONTROL SWITCH IN FREEZER COMPARTMENT

[75] Inventor: Nam Seon Cho, Kyungsangnam-do, Rep. of Korea

[73] Assignee: Goldstar Co., Ltd., Seoul, Rep. of Korea

[21] Appl. No.: 380,086

[22] Filed: Jan. 30, 1995

[30] Foreign Application Priority Data

Feb. 4, 1994 [KR] Rep. of Korea ............... 2155/1994

[51] Int. Cl.$^6$ .................. F25D 25/00; F24B 1/00
[52] U.S. Cl. .............. 62/465; 62/229; 236/DIG. 19
[58] Field of Search ................... 62/229, 465, 418, 62/407; 236/DIG. 19, 78 R, 49.3; 312/401; 126/39, 6; 219/413

[56] References Cited

U.S. PATENT DOCUMENTS

| | | | |
|---|---|---|---|
| 1,999,299 | 4/1935 | Lowry et al. | 337/380 X |
| 2,801,526 | 8/1957 | Solley, Jr. | 62/407 X |
| 2,827,534 | 3/1958 | Grayson | 337/327 X |
| 2,947,153 | 8/1960 | Atchison | 62/229 X |
| 3,027,735 | 4/1962 | Preotle et al. | 62/407 |
| 3,232,112 | 2/1966 | Wehlau | 236/DIG. 19 |
| 3,293,875 | 12/1966 | Kelly | 62/229 X |

FOREIGN PATENT DOCUMENTS 0199925  12/1982  Japan .................. 236/DIG. 19

*Primary Examiner*—William E. Wayne
*Attorney, Agent, or Firm*—Fliesler, Dubb, Meyer & Lovejoy

[57] ABSTRACT

A mounting device for a temperature control switch in a freezer compartment for advantageously providing a more spacious freezer compartment, which includes a grill member provided on the rear wall having a temperature control switch support member formed on a front surface thereof and having a plurality of openings for permitting cooled air to flow into the freezer compartment; and a temperature control switch, mounted to the back side of the temperature control switch member and having a temperature control knob inserted onto a setting shaft thereof.

4 Claims, 2 Drawing Sheets

MOUNTING DEVICE FOR TEMPERATURE CONTROL SWITCH IN FREEZER COMPARTMENT

BACKGROUND OF THE INVENTION

1. Field of the Invention

The present invention relates to a mounting device for a temperature control switch in a freezer compartment, and particularly to a mounting device for a temperature control switch in a freezer compartment for advantageously providing a more spacious freezer compartment in a refrigerator.

2. Description of the Conventional Art

Conventionally, a refrigerator 10 includes a freezer compartment 20 and a refrigerator compartment 30. The freezer compartment 20 is provided with a freezer compartment door 20a for closing/opening the freezer compartment 20. The refrigerator compartment 30 is provided with a refrigerator compartment door 30a for closing/opening the refrigerator compartment 30. In addition, in a predetermined portion of the freezer compartment 20 there is provided a temperature control switch housing 40 in which is mounted a temperature control switch 41 for controlling the temperature in the freezer compartment 20 to a predetermined level. A support member 41a is disposed at the side surface of the temperature control switch 41, a predetermined portion of which is affixed to a predetermined portion of the temperature control switch housing 40. In addition, a front support member 41b is formed on the front surface of the temperature control switch 41, a predetermined portion of which is affixed to a predetermined portion of the temperature control switch housing 40. The temperature control switch 41 is provided with a setting shaft 41c and one end thereof projects externally by a predetermined length. In addition, a connecting cable 42 is connected between a predetermined portion of the temperature control switch 41 and a microcomputer(not shown) for transmitting/receiving a predetermined signal. Here, the temperature control switch 41 is mounted into a predetermined portion of the upper surface of the temperature control switch housing 40. A temperature control knob 44 is fitted onto the setting shaft 41c.

The operation of the conventional temperature control switch for a refrigerator will now be explained with reference to FIGS. 1A and 1B.

To begin with, the temperature in the freezer compartment 20 is maintained to a predetermined level in accordance with a set level by adjusting the temperature control knob 44. At this time, a predetermined value corresponding to the set temperature level is stored in the microcomputer(not shown). Here, when the temperature in the freezer compartment 20 exceeds over a predetermined level, the temperature control switch 41 enables activation of the compressor(not shown) to generate cooled air. Thereafter, the cooled air flows into the freezer compartment 20 through the cooled air opening(not shown) which is formed in a predetermined portion of the rear wall of the freezer compartment 20, so that temperature in the freezer compartment 20 is maintained to a predetermined level in accordance with a previously set level.

However, so as to maintain a predetermined temperature level in the freezer compartment 20, there should be provided the temperature control switch housing 40 for mounting the temperature control switch 41 and having a relatively big size, so that the usable volume of the freezer compartment 20 is disadvantageously reduced.

SUMMARY OF THE INVENTION

Accordingly, it is an object of the present invention to provide a mounting device for a temperature control switch in a freezer compartment in a refrigerator enabling more usable space in the freezer compartment.

To achieve the above object, the mounting device for a temperature control switch of a freezer compartment of a refrigerator according to the present invention includes a grill member provided on the rear wall of the freezer compartment having a temperature control switch support member formed on a front surface thereof and having a plurality of openings for permitting cooled air flow into the freezer compartment; and a temperature control switch, mounted to the back side of the temperature control switch member and having a temperature control knob inserted onto a setting shaft provided at a central portion thereof.

DETAILED DESCRIPTION OF THE INVENTION

Figure 1A:
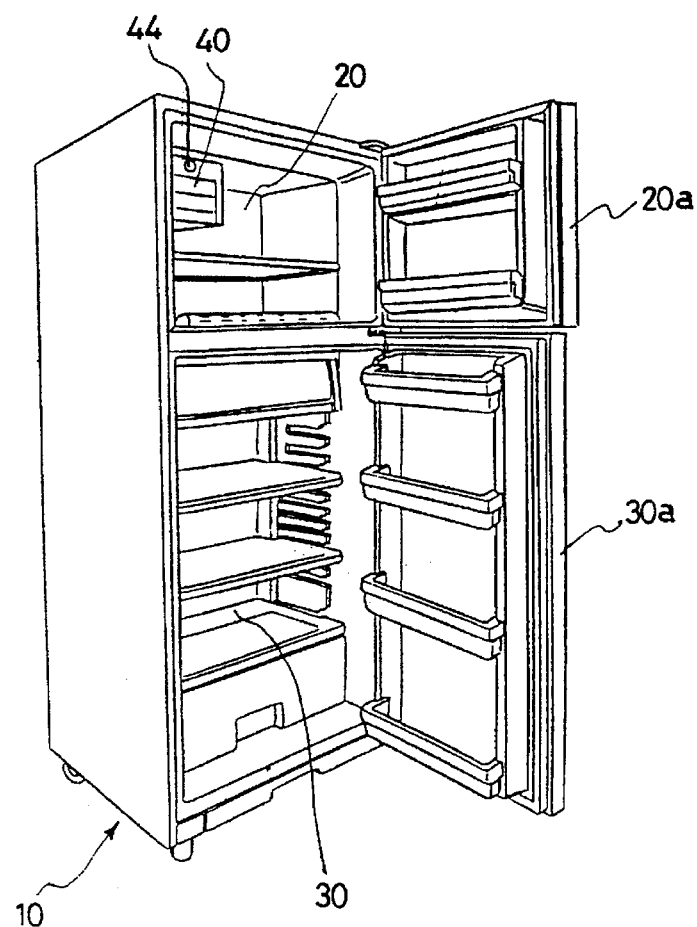
FIG. 1A is a perspective view showing the overall structure of a refrigerator equipped with a conventional temperature control switch housing.
Figure 1B:
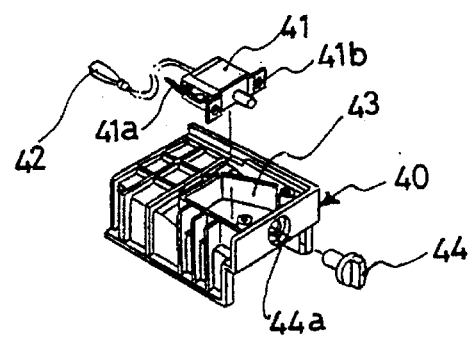
FIG. 1B is a perspective view showing in more detail the structure of the conventional temperature control switch housing.
Figure 2A:
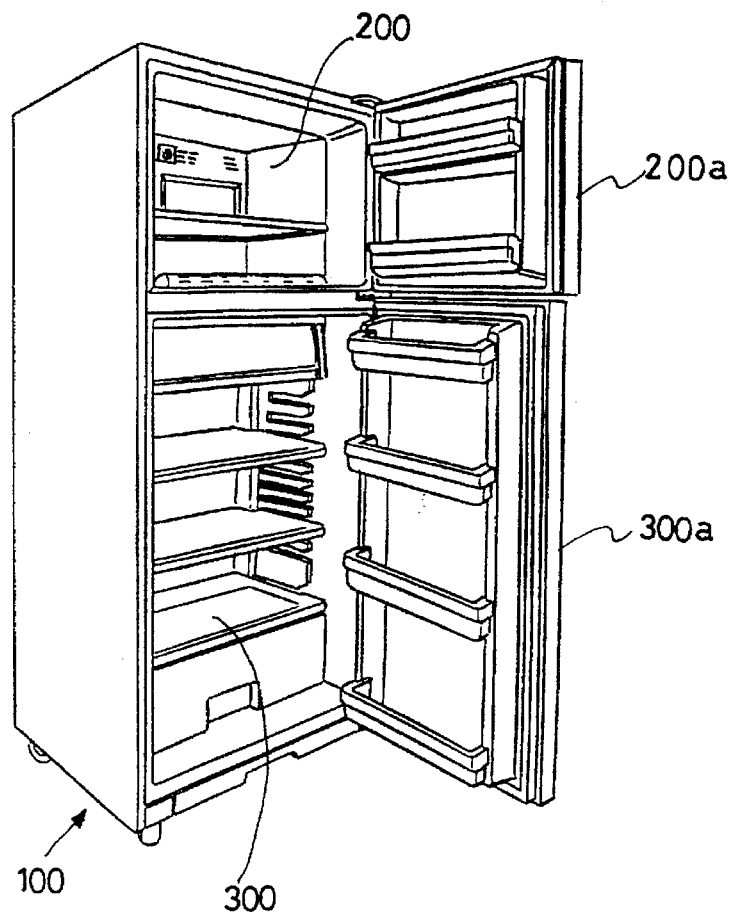
FIG. 2A is a perspective view showing an overall structure of a refrigerator equipped with a mounting device for a temperature control switch in a freezer compartment according to the present invention.
Figure 2B:
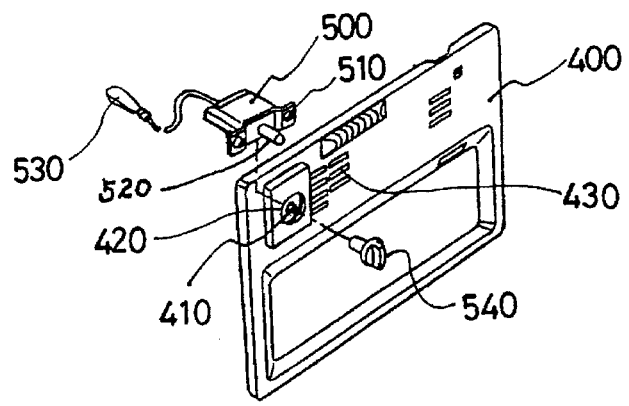
FIG. 2B is a perspective view showing in more detail the structure of the mounting device for the temperature control switch in the freezer compartment in refrigerator according to the present invention.

The structure of the mounting device for a temperature control switch in a freezer compartment of a refrigerator according to the present invention will now be explained with reference to FIGS. 2A and 2B.

To begin with, a refrigerator 100 includes a freezer compartment 200 and a refrigerator compartment 300. The freezer compartment 200 is provided with a freezer compartment door 200a for closing/opening the freezer compartment 200. The refrigerator compartment 300 is provided with a refrigerator compartment door 300a for closing/opening the refrigerator compartment 300. In addition, on a rear wall of the freezer compartment 200 is provided a grill member 400 provided with a temperature control switch support member 420 in a central portion of which is formed a temperature control knob opening 410. In addition, on the surface of the grill member 400 are formed a plurality of cooled air openings 430 for allowing cooled air to flow therethrough. Here, a front support member 510 formed on the temperature control switch 500 is fixed to a predetermined portion of the back of the temperature control switch support member 420, as by fixing screws or the like. A setting shaft 520 is rotatably engaged in the temperature control switch 500, an outer end of which setting shaft 520 is projected by a predetermined height for receiving a temperature control knob 540 thereonto. In addition, a connecting cable 530 is connected between a predetermined portion of the temperature control switch 500 and a microcomputer(not shown) for transmitting/receiving a predetermined signal therethrough.

The operation of the mounting device for the temperature control switch in the freezer compartment of a refrigerator according to the present invention will now be explained with reference to FIGS. 2A and 2B.

To begin with, the temperature level in the freezer compartment 200 is set to a predetermined level by adjusting the temperature control knob 540. At this time, a predetermined value which is obtained by setting the control knob is stored in the microcomputer(not shown). Here, when in use of the refrigerator, if the temperature in the freezer compartment 200 exceeds a predetermined level, the temperature control switch 500 enables activating the compressor(not shown) to be turned on to generate cooled air. Thereafter, the cooled air flows into the freezer compartment 200 through the cooled air openings 430 which are formed in the surface of the grill member 400, so that the temperature in the freezer compartment 200 is maintained to a predetermined temperature level which is set by adjusting the temperature control knob 540.

As described above, there is provided a mounting device for a temperature control switch of a freezer compartment in refrigerator, capable of advantageously controlling temperature in refrigerator, whereby the usable volume of the freezer compartment may be increased compared with the conventional temperature control switch having mounting a temperature control switch by as much as the volume of the removed temperature control switch housing.

What is claimed is:

1. In a freezer compartment having a rear wall, two side walls, a bottom surface and upper surface, a mounting device for mounting a temperature control switch in the freezer compartment, comprising:

a grill member provided on the rear wall and provided with a temperature control switch support member and having a plurality of openings formed in a front surface thereof for permitting cooled air to flow into the freezer compartment; and a temperature control switch, mounted to a back side of the temperature control switch support member by a fixing means and having a temperature control knob inserted onto a setting shaft thereof.

2. The mounting device of claim 1, wherein said temperature control switch includes a front support member fixed to a predetermined portion of the back of the temperature control switch support member.

3. The mounting device of claim 1, wherein said fixing means is by means of screws.

4. In a freezer compartment having a rear wall, two side walls, a bottom surface and a top surface, a mounting device for mounting a temperature control switch in the freezer compartment, comprising:

a grill member forming the rear wall of the freezer compartment and extending from the top surface to the bottom surface between the two side walls of the freezer compartment, said grill member supporting a flat temperature control switch support member with a front side and a back side that do not substantially protrude into the freezer compartment and therefore that do not reduce the volume of the freezer compartment, said grill member having a plurality of openings for permitting cooled air to flow into the freezer compartment;

a temperature control switch mounted by a fitting means to said back side of the temperature control switch support member so as not to protrude into the freezer compartment, said temperature control switch having a movable temperature setting shaft; and a temperature control knob inserted onto the temperature setting shaft and extending to the freezer compartment so as to be movable for setting the freezer compartment temperature.

* * * * *